March 6, 1962 J. E. BALLMER 3,023,635
MECHANICAL DRIVE
Filed Jan. 14, 1960 4 Sheets-Sheet 1
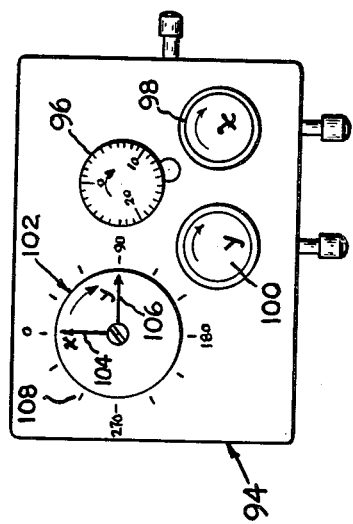
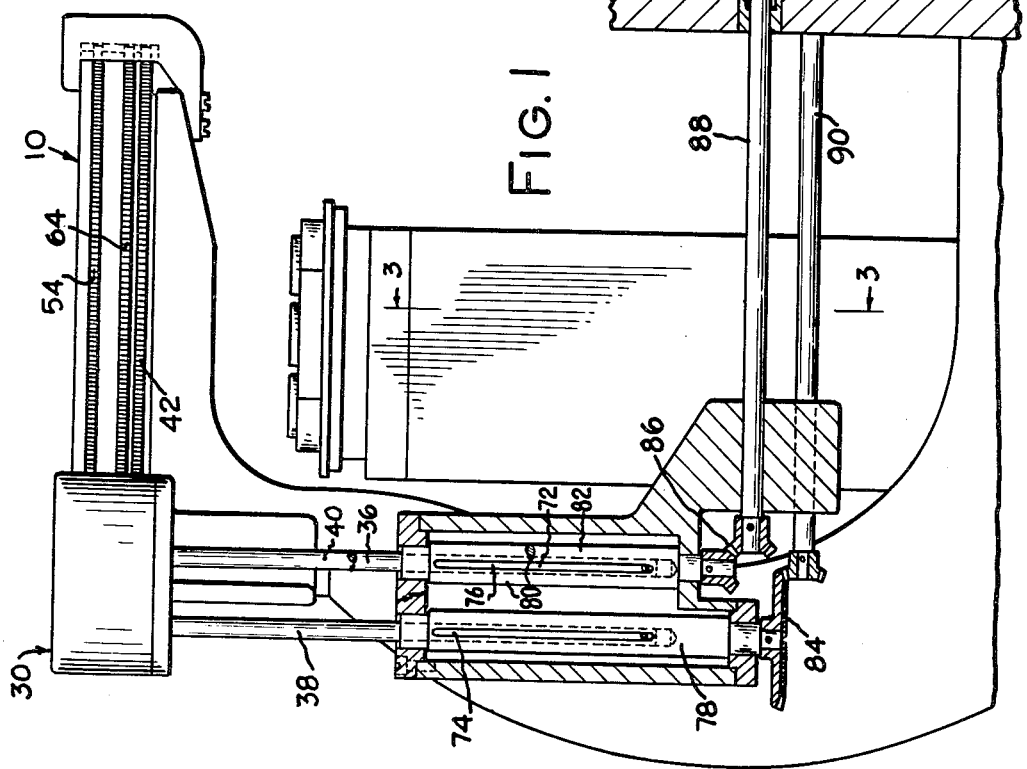
INVENTOR.
JAMES E. BALLMER
BY
ATTORNEYS March 6, 1962 J. E. BALLMER 3,023,635
MECHANICAL DRIVE
Filed Jan. 14, 1960
4 Sheets-Sheet 2

INVENTOR.
JAMES E. BALLMER
BY Frank C. Parker
Hoffman Stone
ATTORNEYS

March 6, 1962 J. E. BALLMER 3,023,635
MECHANICAL DRIVE

Filed Jan. 14, 1960 4 Sheets-Sheet 3

INVENTOR.
JAMES E. BALLMER
BY
ATTORNEYS

March 6, 1962  J. E. BALLMER  3,023,635
MECHANICAL DRIVE
Filed Jan. 14, 1960  4 Sheets-Sheet 4

INVENTOR.
JAMES E. BALLMER
ATTORNEYS

United States Patent Office 3,023,635
Patented Mar. 6, 1962

3,023,635
MECHANICAL DRIVE
James E. Ballmer, Chili, N.Y., assignor to Bausch & Lomb Incorporated, a corporation of New York
Filed Jan. 14, 1960, Ser. No. 2,375
8 Claims. (Cl. 74—665)

This invention relates to an improved mechanical drive apparatus for controllably driving a driven member from a remote station, and more particularly to a remote drive apparatus of this type including means for selectively rotating the driven member and for driving it in translation.

Remote control devices are of increasing commercial importance, especially in view of the increase in nuclear energy investigation and exploitation, involving radiation hazards and the need to shield personnel from radioactive workpieces. Electrical servo systems are widely used in such devices, but such systems are subject to certain disadvantages such as, for example, relatively high cost, and the psychological effect on the operator occasioned by the lack of a positive mechanical connection between the operator's hand and the driven member. In certain other devices heretofore proposed, a combination of mechanical controls have been used including Bowden wire connections, but these have been subject to limitations and have not met with ready market acceptance. There appears to be a clear demand for a compact, versatile, smoothly operating mechanical arrangement for remote control of a movable member providing a high degree of freedom of movement, and independent control of various different motions.

Accordingly, one important object of the present invention is to provide an improved remote control device.

Other objects are: to provide an improved remote control device including means for producing at least two different motions of a driven member independently of each other; to provide an improved remote control device of this character including means for rotating a reference coordinate system without limitation as to angular displacement, and means for controllably moving a driven member in translation with respect to the rotatable coordinate system; to provide an improved remote control mechanism for controllably moving the specimen holder in a metallographic microscope; to provide an improved remote control mechanism of this character including positive mechanical connections between the specimen holder and the control members accessible to the operator; to provide an improved remote control mechanism of this type which is fully flexible in operation and capable of controllably moving the specimen holder in any desired manner; and, in general, to provide an improved remote control mechanism which is of relatively simple, inexpensive, rugged, and long-lasting construction, and at the same time capable of providing highly accurate control of the driven member.

The foregoing and other objects and advantages of the present invention will become apparent in the following detailed description of a representative embodiment thereof taken in conjunction with the drawings, wherein:

FIG. 1 is a cross sectional view, partly in elevation, of a remote control mechanism according to the present invention, as adapted for controllably operating the stage of a metallographic microscope;

FIG. 8 is a front elevational view of the control panel which constitutes part of the remote control station.

Figure 7:
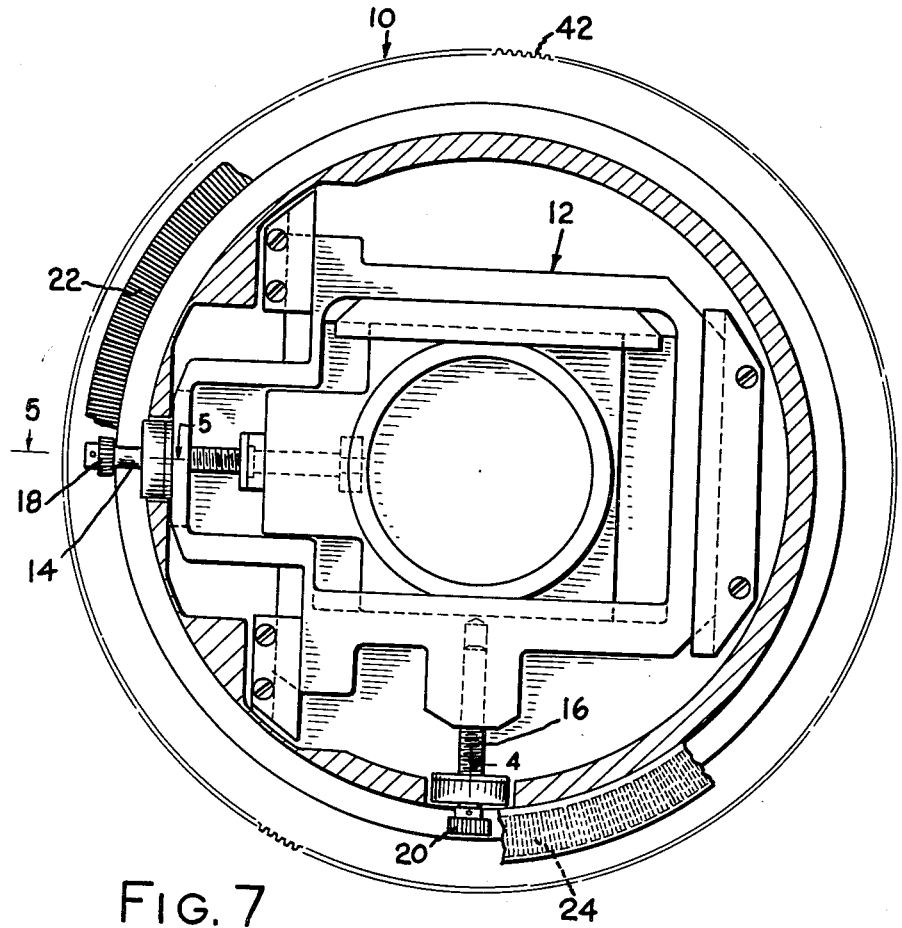
FIG. 7 is a plan view of the stage with parts broken away.

The drive mechanism illustrated in the drawings is arranged for use with a metallographic microscope for controllably driving the microscope stage 10 and the cross slide 12 (FIG. 7) mounted thereon. Except for the drive arrangement, as hereinafter described, the stage 10 and the cross slide 12 may be of entirely conventional construction. As shown, the stage 10 is freely rotatable so that a specimen supported upon the cross slide 12 may be rotated through any desired angular displacement and moved in translation relative to the stage.

The problem with which the present embodiment of the invention is concerned relates to providing a remote control mechanism for rotating the stage 10 and at the same time producing any desired motion of the cross slide 12 relative to the stage regardless of the angular position of the stage. It is desired to provide a single remote control member for rotating the stage 10 without disturbing the position of the cross slide 12 relative to the stage 10, and to provide for such rotation without limit. It is also desired to provide separate controls for moving the cross slide in translation relative to the stage along each of the coordinate axes as defined by the cross slide drive screws 14 and 16 regardless of the angular position of the stage.

In the ordinary metallographic stage arrangement, the cross slide drive screws 14 and 16 are actuated through micrometer heads (not shown). In accordance with the invention, the micrometer heads of the conventional cross slide drive are removed and replaced with individual bevel gears 18 and 20 which are fixed on the respective screws 14 and 16 at the outer ends thereof. The gears 18 and 20 mesh respectively with ring bevel gears 22 and 24, which are rotatable on the stage 10 and coaxial therewith. The first cross slide bevel gear 18 meshes only with the lower ring bevel gear 22, and the second cross slide bevel gear 20 meshes only with the upper ring bevel gear 24. Rotation of the lower ring bevel gear 22 relative to the stage 10 rotates the first drive screw 14 to drive the cross slide 12 in one coordinate direction relative to the stage 10. Rotation of the upper ring bevel gear 24 relative to the stage 10 drives the second cross slide screw 16 to move the cross slide in the other coordinate direction relative to the stage 10. When the stage 10 and the ring bevel gears 22 and 24 all rotate together, without relative rotation between the ring bevel gears 22 and 24 and the stage 10, there is no translatory movement of the cross slide 12.

Figure 4:
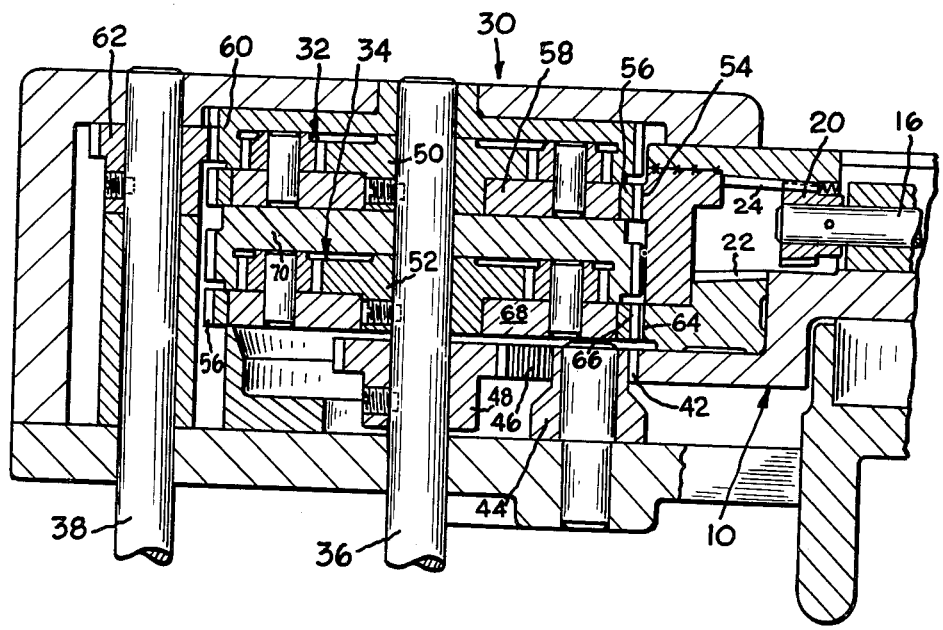
FIG. 4 is a cross sectional view of the gear train of the remote control mechanism taken along the lines 4—4 of FIGS. 2 and 7.
Figure 5:
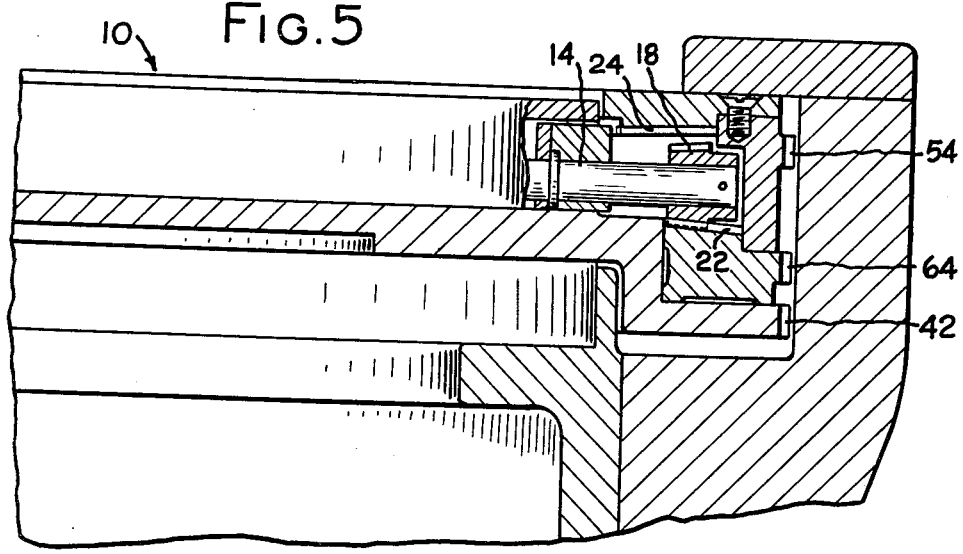
FIG. 5 is a fragmentary sectional view of the metallographic microscope stage, taken along the line 5—5 of FIG. 7.
Figure 6:
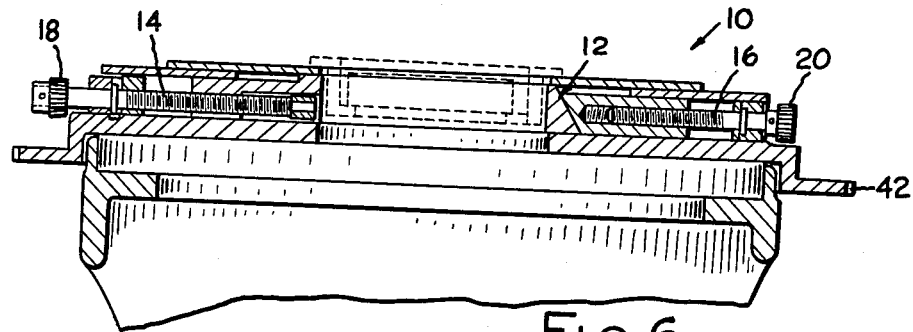
FIG. 6 is a cross sectional view of the stage, particularly showing the cross slide drive arrangement.

The stage 10 and the ring bevel gears 22 and 24 are all drivable through the gear train 30 shown in FIG. 4. The gear train 30 includes two epicyclic gear sets 32 and 34 which are illustratively shown in the form of planetary gear sets. There are three separate drive shafts 36, 38, and 40, two of which are included in the view of FIG. 4. The central shaft 36 may be called the rotation drive shaft because it is connected for rotating the stage 10. A ring gear 42 is fixed around the periphery of the stage 10, and is geared to the rotation drive shaft 36 through two idler pinions 44 and 46 and a third pinion 48 fixed on the drive shaft 36. This provides a positive mechanical connection for rotating the stage 10.

The sun gears 50 and 52 of the two planetary gear sets 32 and 34, respectively, are also fixed to the rotation drive shaft 36. The first planetary set 32 is connected for driving the upper ring bevel gear 24. The second planetary set 34 is connected for driving the lower ring bevel gear 22. The upper ring bevel gear 24 carries a peripheral spur gear 54, which is of the same diameter as the gear 42 carried by the stage, and which meshes with a spur gear 56 fixed on the carrier 58 of the first planetary gear set. The ring gear 60 of the first planetary gear set meshes on its outer diameter with a pinion 62 fixed to the first translation drive shaft 38. This provides a positive mechanical connection through the planetary gear set 32 and the drive shaft 38 for rotating the upper bevel gear 24 relative to the stage 10.

The gear ratio of the planetary set 32 and the ratio between the rotation drive pinion 48 and the stage ring gear 42 are selected so that turning of the rotation drive shaft 36 while the first translation drive shaft 38 is held stationary produces exactly similar rotation of the upper ring bevel gear 24 and the stage 10 without relative rotation between them. Turning of the translation drive shaft 38 drives the planetary ring gear 60 which causes the planet carrier 58 to rotate and to turn the upper ring bevel gear 54 relative to the stage, thus turning the drive screw 16 to move the cross slide 12 in one coordinate direction.

Figure 2:
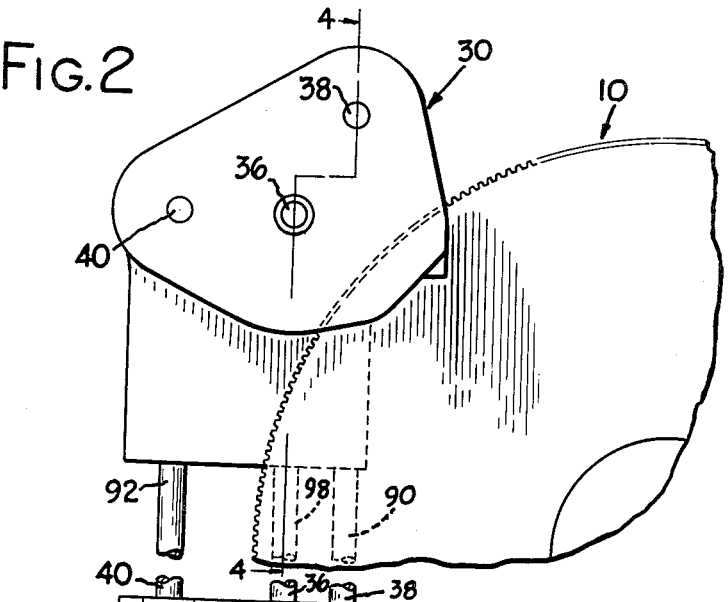
FIG. 2 is a fragmentary plan view of the remote control mechanism shown in FIG. 1.

A similar arrangement is provided for the other cross slide drive screw 14. The lower ring bevel gear 22 carries a peripheral spur gear 64 which meshes with a spur gear 66 fixed on the carrier 68 of the second planetary gear set 34. The sun gear 52 of this gear set is fixed to the rotation drive shaft 36, and the ring gear 70 meshes on its outer diameter with a pinion (not shown) fixed on the second translation drive shaft 40 (FIGS. 1 and 2). Turning the second translation drive shaft 40 thus drives the cross slide screw 14 for driving the cross slide in the other coordinate direction.

The rotation drive shaft 36 is geared for turning all of the stage elements including the stage 10 itself and the two bevel gears 22 and 24 (which are rotatable on the stage), synchronously without producing relative rotation between the bevel gears 22 and 24 and the stage 10 such as would effect translation of the cross slide 12. This comes about by reason of appropriate selection of the gear ratios. The gear ratio between the pinion 48 and the stage ring gear 42 is correlated with the planetary ratio of the two planetary sets 32 and 34 to produce equal angular displacement of the stage 10 and the two bevel gears 22 and 24 in response to any given rotation of the rotation drive shaft 36. In addition, the translation drive shafts 38 and 40 are always positively geared to their respective cross slide drive screws 14 and 16 regardless of the angular position or condition of motion of the stage 10. The stage 10 may be rotated continuously and unidirectionally in either direction without limit, and the cross slide 12 may be driven as desired without limitation due to the rotational drive arrangement.

Figure 3:
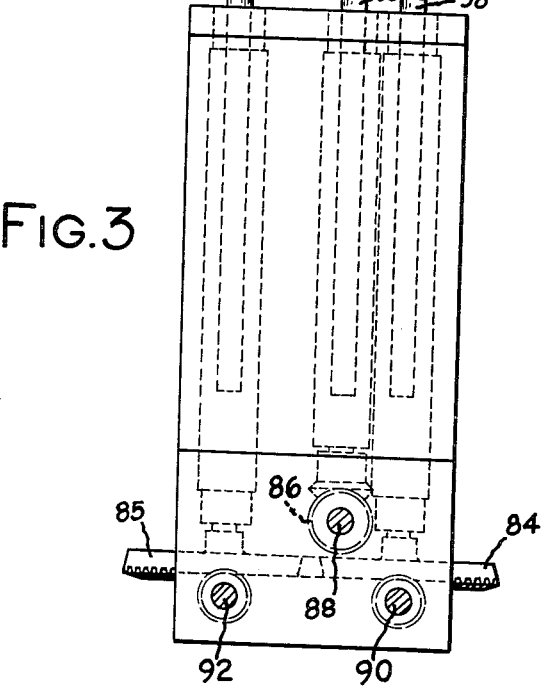
FIG. 3 is a cross sectional view taken along the line 3—3 of FIG. 1.

The remainder of the construction is relatively straightforward. The three drive shafts 36, 38, and 40 are brought down through spline connections 72, 74, and 76, respectively, to secondary shaft 78, 80, and 82 to permit vertical movement of the stage 10 by any desired elevator mechanism (not shown). The secondary shafts 78, 80, and 82 are connected through bevel gear sets 84, 85, and 86 (FIG. 3) to horizontal shafts 88, 90, and 92, which extend through a control panel 94 and mount the control knobs 96, 98, and 100.

A rotatable orientation guide 102 is mounted on the panel 94 for correlating the stage coordinate directions with the operator's space coordinate directions. The orientation guide 102 is geared to the horizontal rotation control shaft 88 for rotation synchronously with the stage 10. The guide 102 carries indicia such as the arrows 104 and 106 indicating the X and Y stage coordinates corresponding to the cross slide drive directions as defined by the drive screws 14 and 16, and indicating their forward directions. An appropriate space coordinate scale 108 is inscribed on the control panel 94 around the orientation guide 102.

Turning the first translation control knob 98 will drive the cross slide in the direction indicated by the correspondingly marked arrow 104, and, similarly, turning of the second translation control knob 100 will drive the cross slide in the other coordinate direction as indicated by the second arrow 106. If desired, the control knobs 96, 98, and 100 may be provided with micrometer heads 110 and 112 to provide any desired degree of precision in the control of the motion imparted to the stage and the cross slide.

The apparatus according to the present invention provides a neat and compact remote control arrangement capable of many uses. It includes positive mechanical connections between the controls accessible to the operator and the driven member. The apparatus may be built for operation with any desired degree of precision and accuracy. For example, anti-backlash gearing may be used throughout, or, if desired, frictional drive elements may be substituted for the gears shown in the illustrated embodiment.

What is claimed is:

1. A drive mechanism for controllably driving a member in translation in a selected direction relative to a predetermined coordinate system and for rotating the coordinate system relative to the operator comprising a base defining a predetermined coordinate system and rotatable relative to the operator, a member mounted on said base for translation relative thereto, a first drive element, means connected between said first drive element and said base for rotating said base responsively to movement of said first drive element, an epicyclic assembly having three drive connections, said first drive element being connected to a first one of said three drive connections, a second drive element connected to a second one of said three drive connections, means connecting the third one of said three drive connections to said member for drive thereby, said epicyclic assembly including means drivably interconnecting all of said three drive connections, and means accessible to the operator for actuating said first and second drive elements.

2. A drive mechanism for controllably driving a member in translation in a selected direction relative to a predetermined coordinate system and for rotating the coordinate system relative to the operator comprising a base defining the predetermined coordinate system and rotatable relative to the operator, a driven member mounted on said base for translatory movement relative thereto, a first drive element, means connected between said first drive element and said base for rotating said base responsively to movement of said first drive element, an epicyclic assembly having three drive connections, said first drive element being connected to a first one of said three drive connections, a second drive element connected to a second one of said three drive connections, a drive member rotatable on said base about the axis of rotation of said base, means connecting said drive member to the third one of said three drive connections for drive thereby, means connecting said drive member to said driven member for driving said driven member in response to relative rotation between said drive member and said base, said epicyclic assembly including means drivably interconnecting all of said three drive connections, and means accessible to the operator for actuating said first and second drive elements.

3. A drive mechanism for controllably driving a member in translation in a selected direction relative to a predetermined coordinate system and for rotating the coordinate system relative to the operator comprising a base defining the predetermined coordinate system and rotatable relative to the operator, a driven member mounted on said base for translatory movement relative thereto, a first drive element, means connected between said first drive element and said base for rotating said base responsively to movement of said first drive element, an epicyclic assembly having three drive connections, said first drive element being connected to a first one of said three drive connections, a second drive element connected to a second one of said three drive connections, a drive member rotatable on said base about the axis of rotation of said base, means connecting said drive member to the third one of said three drive connections for drive thereby, means connecting said drive member to said driven member for driving said driven member in response to relative rotation between said drive member and said base, said epicyclic assembly including means drivably interconnecting all of said three drive connections, and means accessible to the operator for actuating said first and second drive elements, the drive ratios between said first and third drive connections and between said first drive element and said base being selected so that movement of said first drive element produces similar rotation of said base and said drive member without relative rotation therebetween.

4. A drive mechanism for controllably driving a member in translation in a selected direction relative to a predetermined coordinate system and for rotating the coordinate system relative to the operator comprising a base defining the predetermined coordinate system and rotatable relative to the operator, a driven member mounted on said base for translatory movement relative thereto, a first rotatable shaft, gear means drivingly connected between said shaft and said base for rotating said base responsively to rotation of said shaft at a predetermined speed ratio relative thereto, a drive member mounted on said base for rotation relative thereto about the axis of rotation of said base, means connected between said drive member and said driven member for driving said driven member in translation in response to relative rotation between said drive member and said base, a planetary gear set having a sun gear, a ring gear, planet gears in mesh with said sun and ring gears and a planet carrier for pivotally mounting said planet gears, said sun gear being fixed to said first shaft for rotation therewith, drive means connected between said carrier and said drive member for rotating said drive member in response to rotation of said carrier, a second rotatable shaft, means coupling said second shaft to said ring gear for rotating said ring gear in response to movement of said second shaft, and means accessible to the operator for rotating said first and second rotatable shafts.

5. A drive mechanism for controllably driving a member in translation in a selected direction relative to a predetermined coordinate system and for rotating the coordinate system relative to the operator comprising a base defining the predetermined coordinate system and rotatable relative to the operator, a driven member mounted on said base for translatory movement relative thereto, a first rotatable shaft, gear means drivingly connected between said shaft and said base for rotating said base responsively to rotation of said shaft at a predetermined speed ratio relative thereto, a drive member mounted on said base for rotation relative thereto about the axis of rotation of said base, means connected between said drive member and said driven member for driving said driven member in translation in response to relative rotation between said drive member and said base, a planetary gear set having a sun gear, a ring gear, planet gears in mesh with said sun and ring gears and a planet carrier for pivotally mounting said planet gears, said sun gear being fixed to said first shaft for rotation therewith, drive means connected between said carrier and said drive member for rotating said drive member in response to rotation of said carrier, a second rotatable shaft, means coupling said second shaft to said ring gear for rotating said ring gear in response to movement of said second shaft, and means accessible to the operator for rotating said first and second rotatable shafts, the gear ratio of said planetary set and said predetermined speed ratio being selected so that rotation of said first shaft produces similar rotation of said drive member and said base without relative rotation therebetween.

6. A remote drive mechanism for the stage and cross slide of a metallographic microscope of the type having a rotatable stage and a cross slide mounted on the stage, a pair of drive screws for respectively driving said slide in each of two coordinate directions, said mechanism comprising a first rotatable drive shaft, means coupling said shaft to the stage for rotating the stage in response to rotation of said shaft, first and second drive members mounted on the stage and rotatable relative thereto about the axis of rotation of the stage, means drivably connecting said first and second drive members respectively to the cross slide screws for rotating them in response to rotation of said first and second drive members respectively, an epicyclic gear set having three drive connections and means drivably interconnecting said three drive connections, said first shaft being connected to a first one of said three drive connections, a second rotatable shaft connected to a second one of said three drive connections, and means coupling the third one of said three drive connections to one of said first and second drive members for driving it in response both to rotation of said first drive shaft and to rotation of said second drive shaft.

7. A remote drive mechanism for the stage and cross slide of a metallographic microscope of the type having a rotatable stage and a cross slide mounted on the stage, a pair of drive screws for respectively driving said slide in each of two coordinate directions, said mechanism comprising a first rotatable drive shaft, means drivably connecting said shaft to the stage for rotating the stage in response to rotation of said shaft, first and second drive members mounted on the stage and rotatable relative thereto about the axis of rotation of the stage, means coupling said first and second drive members respectively to the cross slide screws for rotating them in response to rotation of said first and second drive members respectively, a planetary gear set having a sun gear, a ring gear, planet gears in mesh with said sun and ring gears and a planet carrier for pivotally mounting said planet gears, said first drive shaft being fixed to said sun gear, a second drive shaft, means drivably connecting said second drive shaft to said ring gear for controllably rotating it, and means connecting said carrier to one of said first and second drive members for driving it in response both to rotation of said first drive shaft and to rotation of said second drive shaft.

8. A remote drive mechanism for the stage and cross slide of a metallographic microscope of the type having a rotatable stage and a cross slide mounted on the stage, a pair of drive screws for respectively driving said slide in each of two coordinate directions, said mechanism comprising a first rotatable drive shaft, means connecting said shaft to the stage for rotating the stage in response to rotation of said shaft, first and second drive members mounted on the stage and rotatable relative thereto about the axis of rotation of the stage, means coupling said first and second drive members respectively to the cross slide screws for rotating them in response to rotation of said first and second drive members respectively, a planetary gear set having a sun gear, a ring gear, planet gears in mesh with said sun and ring gears and a planet carrier for pivotally mounting said planet gears, said first drive shaft being fixed to said sun gear, a second drive shaft, means connecting said second drive shaft to said ring gear for controllably rotating it, and means connecting said carrier to one of said first and second drive members for driving it in response both to rotation of said first drive shaft and to rotation of said second drive shaft, the relationship between the speed ratio of said means connecting said first shaft to the stage and the gear ratio through said planetary set between said first shaft and said one of said first and second drive members being such that rotation of said first shaft produces similar rotation of the stage and said one of said first and second drive members without relative rotation between them.

References Cited in the file of this patent

UNITED STATES PATENTS

| | | |
|---|---|---|
| 1,157,307 | Hendeson | Oct. 19, 1915 |
| 2,196,368 | Thomson | Apr. 9, 1940 |
| 2,370,675 | McCoy | Mar. 6, 1945 |
| 2,403,874 | Needham | July 9, 1946 |

FOREIGN PATENTS

| | | |
|---|---|---|
| 711,946 | France | July 8, 1931 |
| 740,077 | France | Nov. 12, 1932 |